United States Patent [19]

Ogo

[11] Patent Number: 4,658,415
[45] Date of Patent: Apr. 14, 1987

[54] X-RAY FILM HOLDER
[75] Inventor: Yoshimasa Ogo, Tochigi, Japan
[73] Assignee: Kabushiki Kaisha Toshiba, Kawasaki, Japan
[21] Appl. No.: 713,854
[22] Filed: Mar. 20, 1985
[30] Foreign Application Priority Data May 16, 1984 [JP] Japan .................................. 59-97827

[51] Int. Cl.⁴ ............................................. G03B 41/16
[52] U.S. Cl. ..................................... 378/187; 378/185
[58] Field of Search ......................... 378/187, 185, 182

[56] References Cited
U.S. PATENT DOCUMENTS 4,399,363 8/1983 Bauer .................................. 378/187
4,555,794 11/1985 Finkenzeller ....................... 378/187

Primary Examiner—Craig E. Church
Attorney, Agent, or Firm—Cushman, Darby & Cushman

[57] ABSTRACT

An X-ray film holder for holding an X-ray film includes at least one pair of support and intensifying plates each defining mutually opposed inner surfaces. A cushion member is adhesively sandwiched between the opposed inner surfaces of the support plate and intensifying screen. To facilitate removal and/or replacement of the intensifying screen, the cushion member includes protective layers interposed between the cushioned member on the one hand and the support plate and intensifying screen on the other hand. The protective layers thus serve to protect the cushioned member from damage by the adhesive bond while yet permitting bonding release of the cushioned member from the support plate and/or intensifying screen to facilitate removal thereof.

7 Claims, 4 Drawing Figures

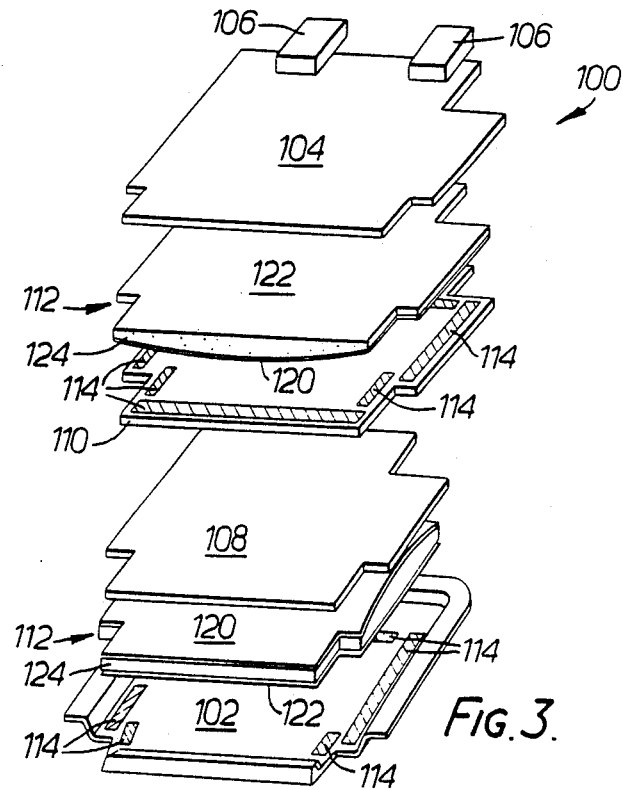

ized and copending U.S. application Ser. No. 578,884 to Tamura et al filed Feb. 10, 1984, the entire disclosure thereof being expressly incorporated hereinto by reference as is the underlying priority document herein, Japanese Application No. P59-97827 filed May 16, 1984.

X-RAY FILM HOLDER

CROSS REFERENCE TO RELATED APPLICATIONS

The present invention finds particular utility when utilized with the X-ray holding device disclosed in commonly-owned and copending U.S. application Ser. No. 578,884 to Tamura et al filed Feb. 10, 1984, the entire disclosure thereof being expressly incorporated hereinto by reference as is the underlying priority document herein, Japanese Application No. P59-97827 filed May 16, 1984.

FIELD OF THE INVENTION

The present invention relates to an X-ray film holding device used in a cassette- or cassetteless-type X-ray photographing apparatus.

BACKGROUND AND SUMMARY OF THE INVENTION

In a cassette-type system, an X-ray film is sandwiched between intensifying screens in a cassette which is placed in a shot position of an X-ray photographing apparatus. In a cassetteless system, on the other hand, X-ray films are taken out one by one from an unexposed film magazine, fed to a fastening device, and then sandwiched between fastening plates of the fastening device in a manner such that an intensifying screen is placed on each surface of the X-ray film. The fastening device travels to a shot position for exposure to X-rays. In such systems, the X-ray film is held in a cassette or fastening device with the intensifying screen on each surface thereof.

To ensure proper cushioning of the X-ray film in the cassette- or cassetteless-type X-ray film holders, it is conventional to provide a cushion member which is sandwiched between at least one intensifying screen on the one hand and the intensifying screens corresponding support plate on the other hand. The cushion member serves not only to cushion the X-ray film sandwiched between the pairs of intensifying screens but also aids in removing air pockets or the like between the X-ray film and the intensifying screens which would otherwise deleteriously affect X-ray exposure of the film.

It is thus conventional to provide adhesive strips so as to adhesively bond the cushion member to the intensifying plate and support plates. For example, in a conventional cassetteless-type X-ray film holder 10 shown in accompanying FIGS. 1 and 2, a cushion member 12 is sandwiched between a back plate 14 and its associated intensifying screen 16. Back plate 14 is coupled to front plate 18 by means of a hinged mounting structure 20 so that back plate 14 can be pivotally moved into opposing relationship relative to front plate 18. The X-ray film 22 is thus sandwiched between the back intensifying screen 16 and a front intensifying screen 24.

In the film holder of FIGS. 1 and 2, it is preferable that the cushioning member 12 be formed of a polyurethane foam material which is resilient in nature and thus exhibits a lower hardness and thinner cross-sectional dimension in a compressed state when the intensifying screens 16, 24 are brought into pressing relationship with X-ray film 22 by virtue of back plate 14 being pivotally moved into opposing relationship relative to front plate 18. Since polyurethane foam exhibits poor adhesive properties, it is conventional to utilize a double-sided adhesive tape 26 (see FIG. 2) interposed between the cushion member 12 and the back plate 14 on the one hand and the cushion member 12 and the intensifying screen 16 on the other hand as can be seen more clearly from FIG. 2.

A problem exists however in that since polyurethane foam forming cushion member 12 is resilient in nature and is compressed a significant amount during use of film holder 10, the adhesive material on double-sided tape 26 tends to penetrate into the void spaces of the polyurethane foam thereby decreasing the rebound elasticity of the foam in the vicinity of the tape 26. Moreover, due to the adhesive bond between tape 26 on the one hand and intensifying screen 16, the polyurethane foam of the cushion member 12 is excessively damaged when intensifying screen 16 is removed thereby necessitating replacement of the cushion member 12 when it is desired to replace screen 16.

The present invention provides a solution to the problems noted above with respect to conventional X-ray film holders in that the cushion member includes protective layers interposed between the cushion member on the one hand and its respective support plate and intensifying screen on the other hand. The protective layer thus protects the cushion member from damage by the adhesive strips which could otherwise occur due to the adhesive bond between the cushion member and its associated support plate and intensifying screens while yet permitting bonding release of the cushion member from the double-sided adhesive tape to facilitate removal of the intensifying screen from the cushion member.

Preferably, the protective layer includes a sheet material having favorable X-ray transmittance (i.e. X-ray permeable) and is preferably a paraffin paper layer which is bonded to the surfaces of the polyurethane foam cushion member by any suitable bonding agent or resin which hardens upon drying, such as, for example, a styrene-budadiene block copolymer.

Further aspects and advantages of the present invention will become more clear to those skilled in this art after consideration is given to the detailed description of the preferred exemplary embodiment thereof which follows.

BRIEF DESCRIPTION OF THE ACCOMPANYING DRAWINGS

Reference will be hereinafter made to the accompanying drawings wherein like reference numerals throughout the various figures denote like structural elements and wherein:

FIG. 1 is a side elevational view of a conventional X-ray film holder;

FIG. 2 is a detailed elevational view of the encircled portion noted by A in FIG. 1;

FIG. 3 is an exploded perspective view showing an X-ray film holder utilizing the present invention; and FIG. 4 is a detailed elevational view of an X-ray film holder of the present invention.

DETAILED DESCRIPTION OF THE PREFERRED EXEMPLARY EMBODIMENT

A preferred embodiment of the present invention is shown in accompanying FIGS. 3 and 4. The X-ray film holder 100 includes a front support plate 102 and a back support plate 104 each made of a material permeable to X-rays and each mounted to one another by hinge mount mechanisms 106 so as to be pivotal into opposing relationship relative to one another. Front and back intensifying screens 108, 110 are respectively operatively associated with front and back support plates 102, 104. Cushion members 112 of the present invention are disposed between respective pairs of plates 102, 104 and intensifying screens 108, 110 so as to cushion an X-ray film (not shown in FIGS. 3 and 4) when placed between intensifying screens 108, 110. As shown in FIG. 3, the facing surfaces of cushion members 112 are curved about a predetermined radius such that the radius of curvature of each cushion member 112 is offset relative to one another at right angles as described in copending application Ser. No. 578,884 filed Feb. 10, 1984.

Cushion members 112 are bonded between the respective pairs of plates 102, 104 and intensifying screens 108, 110 by means of double-sided adhesive strips 114 placed along the peripheral sides of each. The placement of cushion member 112 of the present invention can be more clearly seen by reference to accompanying FIG. 4 which depicts an exploded elevational view of a representative portion of the back support plate 104 and back intensifying screen 110. Each cushion member 112 includes front and back protective layers 120, 122 so as to be interposed between the polyurethane core 124 of cushion members 112 and their respective pair of plates 102, 104 and intensifying screens 108, 110. Preferably, front and back protective layers 120, 122 each include a paraffin paper layer which exhibits advantageous release properties relative to the adhesive on adhesive strips 114 and a favorable X-ray transmittance. The paraffin paper layer is preferably bonded integrally with the cushion core 124 of the cushion member 112 by means of a hardened bonding agent or resin, such as a styrene-butadiene block copolymer.

In accordance with the structure of the present invention therefore it is now possible to securely and adhesively bond the cushion member 112 to the support plates 102, 104 and to, in turn, bond the intensifying screens 108, 110 to the cushion members 112 by means of the double-sided adhesive strips 114 while yet permitting replacement of intensifying screens 108, 110 without damage to the cushion layers 112 due to their protective layers 120, 122. Thus, the present invention promotes interchangeability and replacement of the intensifying screens without damaging the cushion layer thereby prolonging the useful life of the cushion member 112.

Although the embodiment of the present invention has been described in relation to a cassetteless-type X-ray film holder the present invention is also usable in a cassette-type film holder. Moreover, other foamed cushion materials other than polyurethane foam could be utilized in the successful practice of the present invention. Accordingly, while the present invention has been described in what is presently conceived to be the most preferred and exemplary embodiment thereof, those skilled in the art may realize that modifications may be made thereto, which modifications shall be accorded the broadest scope of the appended claims so as to encompass all equivalent structures and devices.

What is claimed is:

1. An X-ray film holder for holding an X-ray film comprising
    at least one structural pair including a support plate and an intensifying screen each defining mutually opposed inner surfaces;
    cushion means disposed between said at least one structural pair for cushioning an X-ray film in said film holder and defining a pair of outer surfaces each in adjacent opposing contact with a respective said inner surface of said at least one structural pair; and
    adhesive means associated with at lesat one said inner surface of said at least one structural pair for adhesively bonding said cushion means to said at least one opposed inner surface; wherein
    said cushion means comprising a cushion core and protective layer means bonded to said cushion core by harden type adhesive material, said protective layer means being provided for potecting said cushion means from damage by said adhesive means by permitting an adhesive bond to be established between said cushion means and said at least one opposed inner surface by virtue of said adhesive means while yet permitting bonding release of said cushion means from said adhesive means to facilitate removal of said cushion member from said at least one opposed surface.

2. An X-ray film holder as in claim 1 wherein said harden type adhesive material comprises a styrene-butadiene block copolymer.

3. An X-ray film holder as in claim 1 wherein said cushion core comprises a resiliently-deformable material.

4. An X-ray film holder as in claim 3 wherein said resiliently-deformable material is polyurethane.

5. An X-ray film holder as in claim 1 wherein said protective layer means comprises an X-ray permeable material.

6. An X-ray film holder as in claim 5 wherein said protective layer means includes a paraffin paper layer.

7. An X-ray film holder comprising:
    front and back pairs of support and intensifying plates,
    means to mount said front and back pairs to one another to permit said front and back pairs to be moved into opposing relationship to one another to hold an X-ray film therebetween,
    cushion means disposed between said support and intensifying plates of each of said front and back pairs, and
    adhesive means to adhesively bond said cushion means to said support and intensifying plates of said front and back pairs,
    said cushion means comprising: a cushion core and protective layer means bonded with said cushion core by harden type adhesive mateial, for protecting said cushion means from damage due to said adhesive means and for establishing an adhesive bond with said adhesive means while yet permitting said cushion means to be released from said adhesive bond when desired to thereby facilitate removal of said cushion means and/or replacement of said intensifying plate.

* * * * *